(12) United States Patent
George

(10) Patent No.: US 12,174,643 B2
(45) Date of Patent: Dec. 24, 2024

(54) SYSTEMS AND METHODS FOR DELIVERING PACKAGES USING MOBILE ROBOTS

(71) Applicant: Nishant Jacob George, Morrisville, NC (US)

(72) Inventor: Nishant Jacob George, Morrisville, NC (US)

(*) Notice: Subject to any disclaimer, the term of this patent is extended or adjusted under 35 U.S.C. 154(b) by 224 days.

(21) Appl. No.: 18/096,836

(22) Filed: Jan. 13, 2023

(65) Prior Publication Data

US 2024/0241519 A1    Jul. 18, 2024

Related U.S. Application Data

(60) Provisional application No. 63/329,864, filed on Apr. 11, 2022.

(51) Int. Cl.
  *G05D 1/00* (2006.01)
  *G06Q 10/0835* (2023.01)

(52) U.S. Cl.
  CPC ..... *G05D 1/0297* (2013.01); *G06Q 10/08355* (2013.01)

(58) Field of Classification Search
  CPC ........... G05D 1/0297; G06Q 10/08355; G06Q 10/087
  USPC .......................................... 701/23
  See application file for complete search history.

(56) References Cited

U.S. PATENT DOCUMENTS

| | | | |
|---|---|---|---|
| 8,606,392 B2* | 12/2013 | Wurman | G05B 19/41895 700/214 |
| 9,792,576 B1 | 10/2017 | Jamjoom et al. | |
| 9,796,529 B1 | 10/2017 | Hoareau et al. | |
| 10,170,006 B2* | 1/2019 | Kline | G08G 5/0091 |
| 10,850,922 B1 | 12/2020 | Alspaugh et al. | |
| 11,138,545 B2* | 10/2021 | Heinla | B25J 9/1661 |
| 11,392,126 B2 | 7/2022 | Tacklind et al. | |
| 2014/0100690 A1 | 4/2014 | Wurman et al. | |
| 2018/0090014 A1* | 3/2018 | Kline | G06Q 10/047 |
| 2019/0130342 A1 | 5/2019 | Maheshwari et al. | |
| 2019/0287051 A1* | 9/2019 | Heinla | G06Q 10/083 |
| 2021/0132625 A1* | 5/2021 | Gillett | B64U 60/60 |
| 2022/0036310 A1* | 2/2022 | Heinla | G06Q 10/08 |
| 2022/0084154 A1 | 3/2022 | Hall et al. | |
| 2022/0187847 A1 | 6/2022 | Cella et al. | |
| 2022/0364876 A1 | 11/2022 | Miller et al. | |
| 2022/0374834 A1* | 11/2022 | Lundeen | B60P 1/6409 |

FOREIGN PATENT DOCUMENTS

| | | | |
|---|---|---|---|
| JP | 2019534829 A | * | 9/2017 |
| JP | 2022038520 A | * | 3/2022 |
| KR | 20200140628 A | * | 12/2020 |

* cited by examiner

*Primary Examiner* — Muhammad Shafi
(74) *Attorney, Agent, or Firm* — The Marbury Law Group, PLLC

(57) ABSTRACT

Systems and methods for delivering packages using mobile robots. In some examples, a system includes a central controller configured for fulfilling package delivery orders. The system includes package delivery robots. Each package delivery robot is configured for navigating to a location of a package in the warehouse and loading the package onto the package delivery robot. Each package delivery robot is configured for navigating to a package destination by travelling on a path through one or more enclosed passageways and unloading the package at the package destination.

16 Claims, 10 Drawing Sheets

SYSTEMS AND METHODS FOR DELIVERING PACKAGES USING MOBILE ROBOTS

PRIORITY CLAIM

This application claims the benefit of U.S. Provisional Patent Application Ser. No. 63/329,864, filed Apr. 11, 2022, the disclosure of which is incorporated herein by reference in its entirety.

TECHNICAL FIELD

The subject matter described herein relates generally to systems and methods for delivering packages. More particularly, the subject matter described herein relates to methods and systems for delivering packages using mobile robots.

BACKGROUND

A delivery network for packages is a system that involves various modes of transportation and logistical processes for getting packages from the sender to the recipient. It may include multiple intermediate stops or hubs where packages are sorted and consolidated for efficient transportation to their final destination.

The delivery network may involve the use of ground transportation such as trucks, vans, or cars to transport packages within a local or regional area. For longer distances or international deliveries, the network may also include the use of planes, trains, or ships.

In addition to transportation, a delivery network may also include processing and handling facilities such as warehouses or distribution centers where packages are stored and sorted prior to being shipped out. These facilities may use automated or manual processes to ensure that packages are correctly labeled and routed to their final destination.

Overall, a delivery network is a complex system that involves a range of logistics, transportation, and processing activities to get packages from the sender to the recipient in a timely and efficient manner.

SUMMARY

Systems and methods for delivering packages using mobile robots. In some examples, a system includes a central controller configured for fulfilling package delivery orders, including, for each package delivery order: determining a location of a package in a warehouse; determining a path from the location of the package in the warehouse to a package destination outside of the warehouse; and instructing a package delivery robot to deliver the package to the package destination by travelling on the path. The system includes package delivery robots each having a propulsion system, a loading system, and a robot controller configured for: navigating, using the propulsion system, to the location of the package in the warehouse; loading, using the loading system, the package onto the package delivery robot; navigating, using the propulsion system, to the package destination by travelling on the path through one or more enclosed passageways; and unloading, using the loading system, the package at the package destination.

The computer systems described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Package delivery using conveyor belts is a common practice in many warehouses and distribution centers. Conveyor belts are used to move packages, boxes, and other items through the facility, allowing for efficient sorting and handling of the items.

One of the main benefits of using conveyor belts for package delivery is that they can handle large volumes of packages quickly and efficiently. They can also be automated, allowing for operation without the need for human labor.

However, there are also some drawbacks to using conveyor belts for package delivery. One potential issue is that conveyor belts can break down or malfunction, disrupting the flow of packages and leading to delays in delivery. Another issue is that conveyor belts may not be suitable for handling all types of packages, particularly those that are irregularly shaped or oversized. In addition, conveyor belts require maintenance and can be expensive to install and operate.

Another potential issue is that conveyors are relatively fixed-route once installed. On top of that, adding sortation to a conveyor belt dramatically increases the system complexity & cost while reducing its reliability.

Figure 1A:
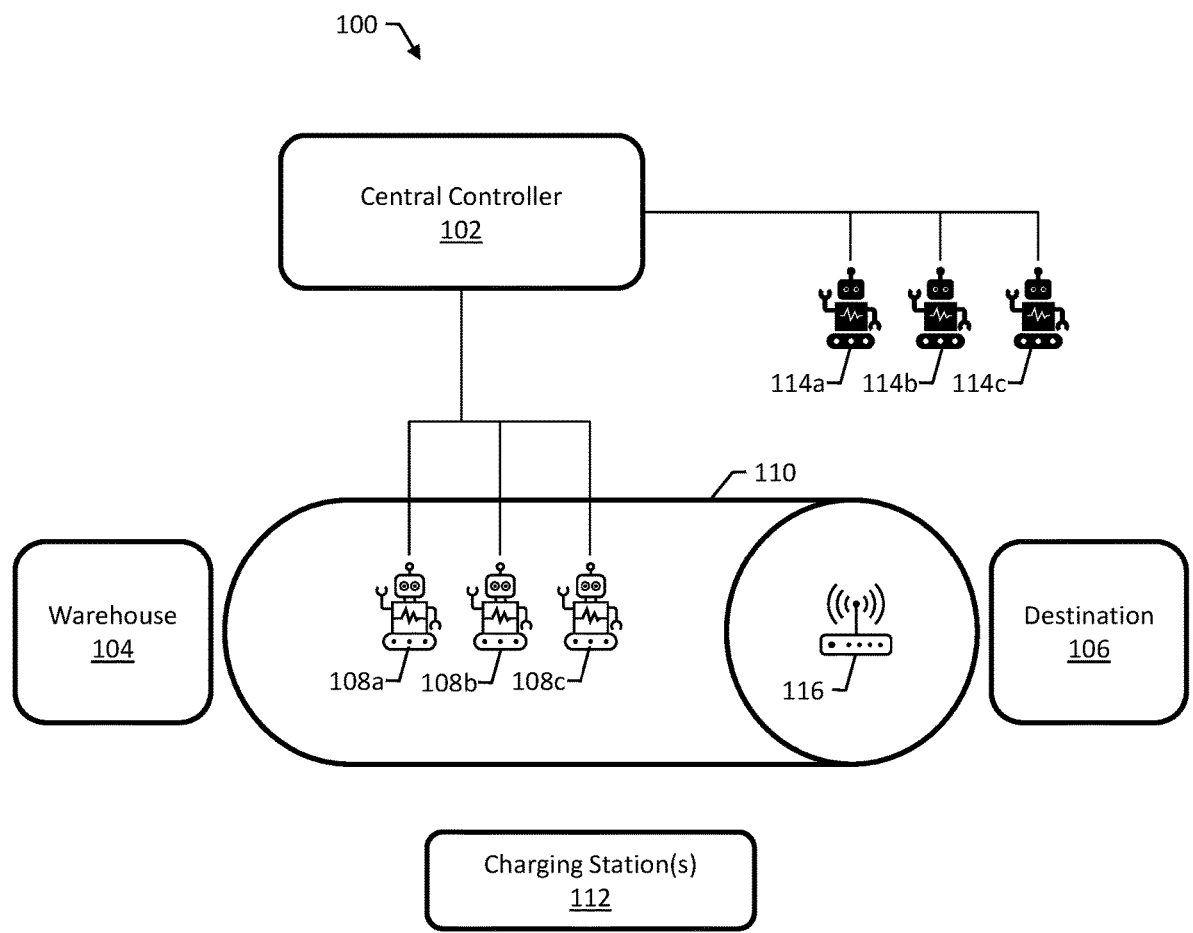
FIGS. 1A-1H illustrate an example system for delivering packages using mobile robots.

FIG. 1A is block diagram of an example system 100 for delivering packages using mobile robots. The system includes a central controller 102, and the central controller 102 is a computer system configured for fulfilling package delivery orders. In response to receiving a package delivery order, the central controller 102 determine a location of a package specified by the order in a warehouse 104. Then, the central controller 102 determines a path from the location of the package in the warehouse 104 to a package destination 106 outside the warehouse 104. The central controller 102 instructs one of a number of package delivery robots 108a-c to deliver the package to the package destination 106 by travelling on the path.

Each of the package delivery robots 108a-c includes a propulsion system, a loading system, and a robot controller. The robot controller is configured for navigating, using the propulsion system, to the location of the package in the warehouse 104 and loading, using the loading system, the package onto the package delivery robot 108a-c. Then, the robot controller navigates, using the propulsion system, to the package destination 106 by travelling on the path through one or more enclosed passageways 110 and unloads, using the loading system, the package at the package destination 106. The enclosed passageways 110 can be, for example, underground tunnels or aboveground corridors.

In some examples, the system 100 includes a number of service robots 114a-c. The service robots 114a-c are mobile robots that can be configured to autonomously or semi-autonomously navigate through the enclosed passageways 110 (and in some cases, the warehouse 104) to aid in the continuous functioning of the system 100. The central controller 102 can be configured to control the service robots 114a-c to address various types of issues that may arise during operation of the system 100.

For instance, the central controller 102 can be configured for detecting one or more malfunctioning package delivery robots 108a-c and controlling one or more of the service robots 114a-c to remediate the one or more malfunctioning package delivery robots. Remediating the malfunctioning package delivery robots can include repairing the malfunctioning robots or extracting the one or more malfunctioning robots from the enclosed passageways 110 or both.

In another example, the service robots 114a-c can be configured for installing, repairing, and removing one or more network beacons 116 within the enclosed passageways 110. The service robots 114a-c can be configured for performing diagnostic tests on malfunctioning package delivery robots and, for example, reporting diagnostic results to the central controller 102 or determining an appropriate service action based on the diagnostic results.

In some examples, each of the package delivery robots 108a-c includes a battery system. Each of the robot controllers can then be configured for monitoring the battery system and determining a time to recharge a battery of the battery system or perform a battery swap at one or more charging stations 112.

The enclosed passageways 110 can be, for example, aboveground corridors or underground tunnels. In the case of underground tunnels, the tunnels can each have a diameter of, e.g., 3', which is wide enough to carry many shipped units which allowing for two-way travel by robots. The package delivery robots 108a-c can access the enclosed passageways 110 from the warehouse 104 by, for example, elevators or ramps or other appropriate structures. In the case of underground tunnels, tunnel entrances and exits may utilize several different methods to allow robots to travel between the surface and underground tunnels. There may be graded, straight, circular, helical or curved ramps to allow continuous robot movement between underground tunnels and the surface.

In some examples, underground tunnels connect origin warehouses to end delivery locations to provide connectivity to a variety of delivery locations. Warehouses can connect to sortation centers and tunnels can connect to delivery/distribution stations within and on the outskirts of metro areas. In some examples, tunnels can connect from delivery stations to "ghost stores," i.e., surface locations where packages will be delivered near their final destination.

The warehouse 104 can be, for example, a 3PL warehouse. 3PL, or third-party logistics, warehouses are facilities that are used to store and manage inventory for businesses on a contract basis. These warehouses are operated by companies that specialize in logistics and supply chain management, and they offer a range of services such as storage, order fulfillment, and transportation management.

In many cases, 3PL warehouses are integrated into larger delivery networks, providing businesses with a convenient and cost-effective way to store and manage their inventory while also ensuring that orders are shipped to customers in a timely and efficient manner. By outsourcing these logistics functions to a 3PL, businesses can focus on their core competencies and leave the logistics management to experts.

The network beacons 116 can be used to form a data communications network within the enclosed passageways 110. The network beacons 116, which can each include radio frequency (RF) transmitters and receivers, can be placed at strategic locations within the passageways 110. In some examples, the network beacons 116 transmit a constant signal that can be picked up by RF receivers, e.g., on mobile robots as they travel through the passageways 110.

The beacons 116 in this type of communications network can be used for a variety of purposes, such as providing location-based information, triggering actions on connected devices, or enabling communication between devices within a certain range. In addition to the beacons 116, the communications network may also include other components such as servers or cloud-based systems to store and manage data, as well as software applications or platforms to facilitate communication and interaction between mobile robots as they travel through the passageways 110.

To ensure full coverage of the communications network implemented by the beacons 116, it is important to consider the range and placement of the beacons, as well as the presence of physical barriers or obstacles that may interfere with the RF signal. One way to ensure full coverage is to place the beacons 116 at regular intervals along the passageways 110, taking into account the range of each beacon and the expected signal strength. For example, beacons 116 can be placed closer together in areas with more turns or curves, as the RF signal may be weakened by physical barriers or obstacles.

In addition, it can be useful to place beacons 116 at key points along the passageways 110, such as at the entrance or exit of the warehouse 104, or at the beginning and end of a corridor. This will help to ensure that the signal is strong and reliable at these points.

In some examples, each beacon 116 will have overlapping coverage from at least one additional beacon to allow continuous network functionality even in the event of failure of any one given beacon. The network can communicate using local area networking such as wired, radio-frequency identification (RFID), Bluetooth, or Wi-Fi. This network will typically be encrypted to prevent unauthorized access and tampering.

The system 100 can, in some examples, include a positioning system to allow the robots 108a-c and 114a-c to determine their locations within the enclosed passageways 110. The positioning system can include any appropriate components, within the enclosed passageways 110 and/or on the robots 108a-c and 114a-c, to enable the robots 108a-c and 114a-c to determine absolute or relative positions within and around the enclosed passageways 110. For example, the positioning system can include one or more of the following components:
1. Passive radio frequency identification (RFID) chips laid on a driving surface of the enclosed passageways 110 or other appropriate location with the enclosed passageways;
2. Quick response (QR) codes displayed in appropriate locations;
3. Triangulation systems using, e.g., the network beacons 116 or other navigation beacons.

The components of the positioning system may be, e.g., printed onto the floor or installed in replaceable tiles or other appropriate flooring or structural components. In general, the components of the position system can be separately installable and maintainable by the service robots 114a-c.

Figure 1B:
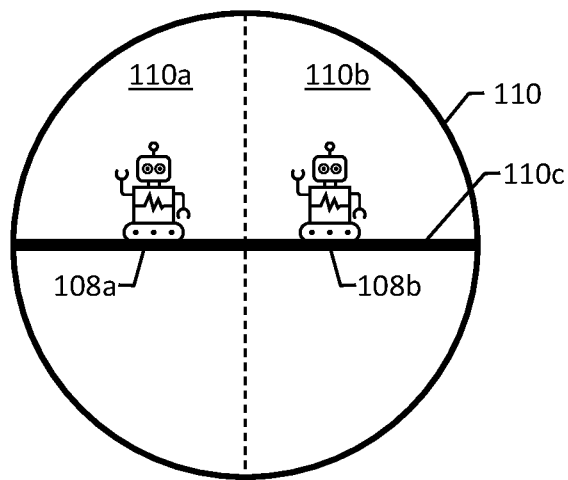

FIG. 1B is a cross sectional view of two package delivery robots 108a-b passing each other while travelling in opposite directions on opposite sides 110a-b of an enclosed passageway 110. The enclosed passageway 110 has a left side 110a, a right side 110b, and a driving surface 110c for the robots 108a-b to travel over. The robot 108a on the left side 110a travels in one direction, and the robot 108b on the right side 110b travels in an opposite direction so that the robots 108a-b do not collide while traveling through the enclosed passageway 110.

Figure 1C:
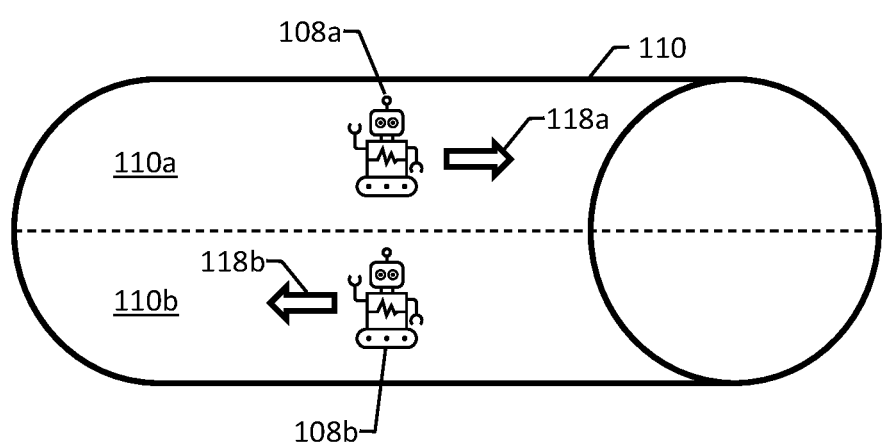

FIG. 1C is a top view of the two package delivery robots 108a-b passing each other while travelling in opposite directions on opposite sides 110a-b of an enclosed passageway 110. The robot 108a on the left side 110a travels in a first direction 118a, and the robot 108b on the right side 110b travels in a second direction 118b opposite the first direction 118a so that the robots 108a-b do not collide while traveling through the enclosed passageway 110.

By travelling on different sides 110a-b of the enclosed passageway 110, the robots 108a-b can travel one way while delivering a package and then travel, in the same enclosed passageway, in the opposite direction on a return trip back to a warehouse or to a different warehouse after delivering the package.

Figure 1D:
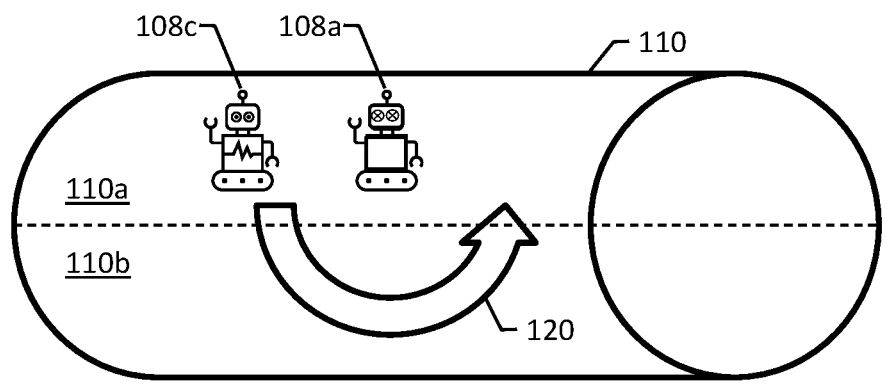

FIG. 1D is a top view of a package delivery robot 108c traversing an obstacle within an enclosed passageway 110. In this example, the obstacle is a malfunctioning package delivery robot 108a. In general, the obstacle can be any kind of physical obstruction of enclosed passage way. For example, the obstacle can be a malfunctioning robot (service robot or package delivery robot), a dropped package, or debris that is in the enclosed passageway.

The malfunctioning package delivery robot 108a may be malfunctioning for any of a variety of reasons. For example, the malfunctioning package delivery robot 108a may be stuck against a side of the enclosed passageway 110, out of battery power, or experiencing a software error.

The package delivery robot 108c detects the obstacle while travelling on a first side 110 of the enclosed passageway. The package delivery robot 108c can use any appropriate obstacle detection system for detecting the obstacle. There are a variety of different technologies and approaches that can be used to detect obstacles, including:
1. Ultrasonic sensors: These sensors emit high-frequency sound waves and measure the time it takes for the sound waves to bounce back after hitting an object. By measuring the time delay, the sensor can determine the distance to the object and identify obstacles in the robot's path.
2. LIDAR (Light Detection and Ranging): LIDAR sensors use lasers to scan their surroundings and create a 3D map of the environment. The sensor can detect obstacles by analyzing the data from the lasers and identifying areas where the laser beams are blocked or reflected.
3. Stereo vision: Stereo vision systems use two or more cameras to capture images of the environment and create a 3D map of the surroundings. The system can then identify obstacles by analyzing the differences in the images captured by the cameras and identifying areas where the images do not match.
4. Radar: Radar sensors use radio waves to detect objects and obstacles in the environment. The sensor can determine the distance and location of obstacles by measuring the time it takes for the radio waves to bounce back after hitting an object.
5. Infrared sensors: These sensors use infrared light to detect obstacles and objects in the environment. The sensor can measure the intensity of the infrared light reflected off of objects and use this information to identify obstacles in the robot's path.

After detecting the obstacle, the package delivery robot 108c waits for a time when no other robot is travelling in the opposite direction on the other side 110b of the enclosed passageway while traversing the obstacle to avoid a collision. In some examples, the package delivery robot 108c determines that no other robots are traveling on the other side 110b; and in some other examples, the package delivery robot 108c communicates with the central controller 102 to determine when no other robot is traveling in the opposite direction on the other side 110b.

The central controller 102 can be configured, for example, to track the location of each package delivery robot in the system 100 and to determine an appropriate time for the package delivery robot 108c to traverse the obstacle. In some situations, for example, where a significant flow of traffic of package delivery robots is traveling in the opposite direction on the other side 110b, the package delivery robot 108c may wait until there is a gap between robots that is sufficiently large to give the package delivery robot 108c enough time to go around the obstacle and return to the original side 110a of the enclosed passageway.

After determining that no other robots are traveling on the other side 110b, such that a collision can be avoided, the package delivery robot 108c travels around the obstacle by following a path 120 from the first side 110a to the second side 110b and the back to the first side 110a after clearing the obstacle. In this manner, the package delivery robots in the system 100 can continue to deliver packages even though an obstacle is present in the enclosed passageway 110.

Figure 1E:
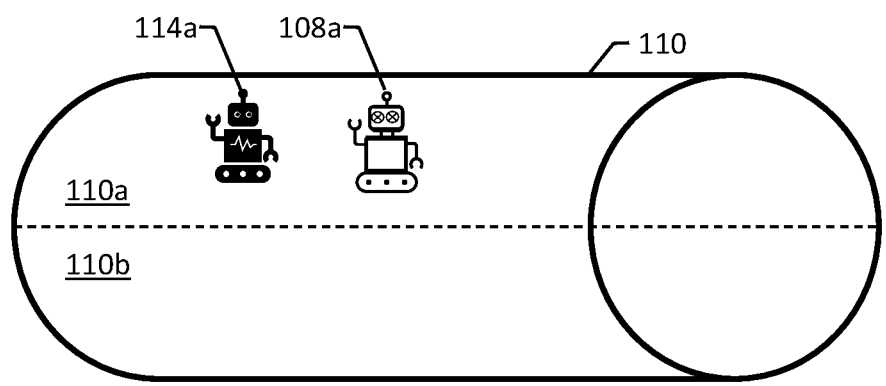

FIG. 1E is a top view of a service robot 114a remediating a malfunctioning package delivery robot 108a. For example, the service robot 114a can be dispatched by the central controller 102 in response to the central controller 102 receiving a distress message from the malfunctioning package delivery robot 108a or in response to the central controller 102 not receiving a response to a status check message sent to the malfunctioning package delivery robot 108a.

The service robot 114a can be configured to remediate the malfunctioning package delivery robot 108a in any appropriate manner. For example, remediating the malfunctioning package delivery robot 108a can include repairing the malfunctioning robot 108a or extracting the malfunctioning robot 108a from the enclosed passageway 110 or both.

Figure 1F:
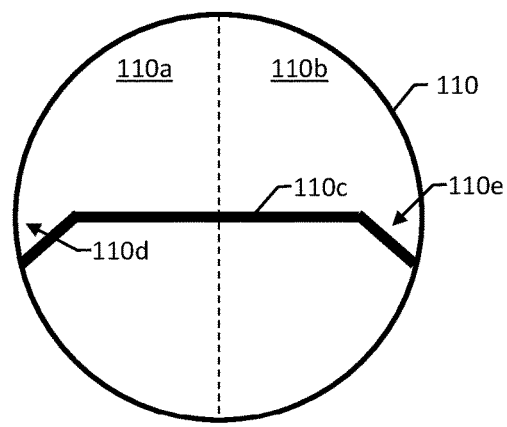
Figure 1G:
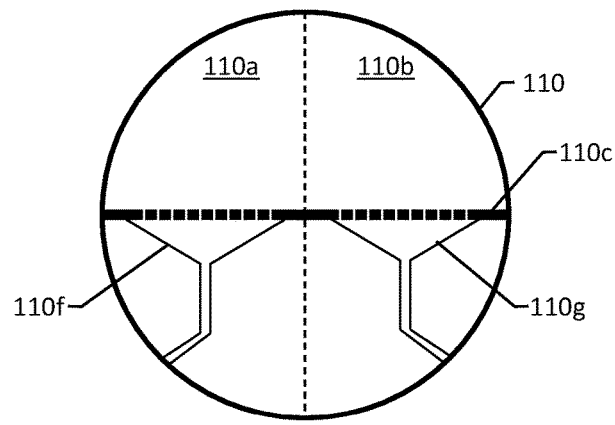

The enclosed passageways 110 can include features to ensure the continuing structural integrity of the passageways 110. For example, the enclosed passageways 110 include channels and/or drains to allow water to flow away from a driving surface within the channels. FIG. 1F shows an example driving surface 110c having side channels 110d and 110e to allow water to drain away. FIG. 1G shows an example driving surface 110c having drains 110f and 110g to allow water to drain away, e.g., through perforations in the driving surface 110c.

Figure 1H:
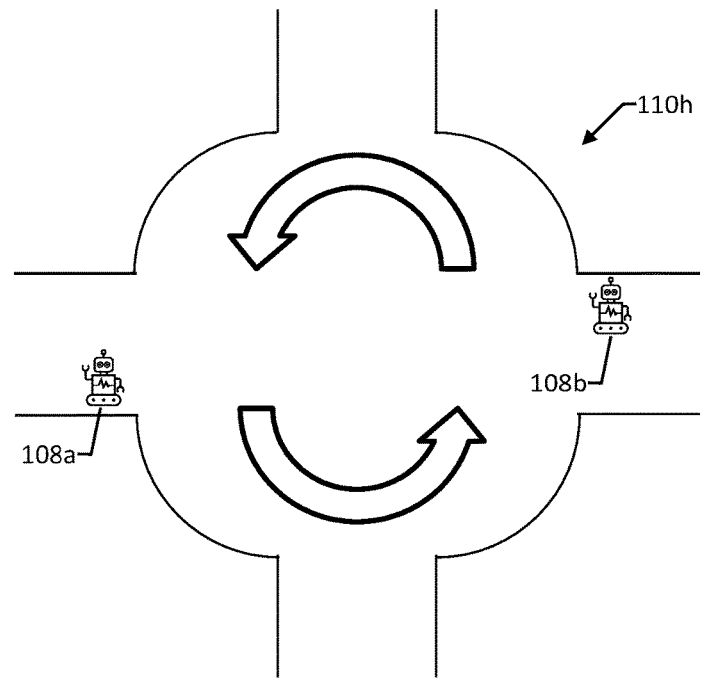

The enclosed passageways 110 can also include various features to allow the package delivery robots 108a-c to navigate and make turns while avoiding collisions. For example, the enclosed passageways 110 can include, or be connected to, intersections, branches, and/or roundabouts to allow the package delivery robots 108a-c to navigate without interruption. FIG. 1H shows an example of a roundabout 110h (which can but need not be enclosed too) and two package delivery robots 108a-b entering the roundabout 110h. Each of the robots 108a-b can be configured to check that the roundabout 110h is clear and then enter the roundabout 110h and travel in a uniform direction to prevent collisions. The robots 108a-b can then exit as needed to follow a path to a package delivery destination.

Figure 2:
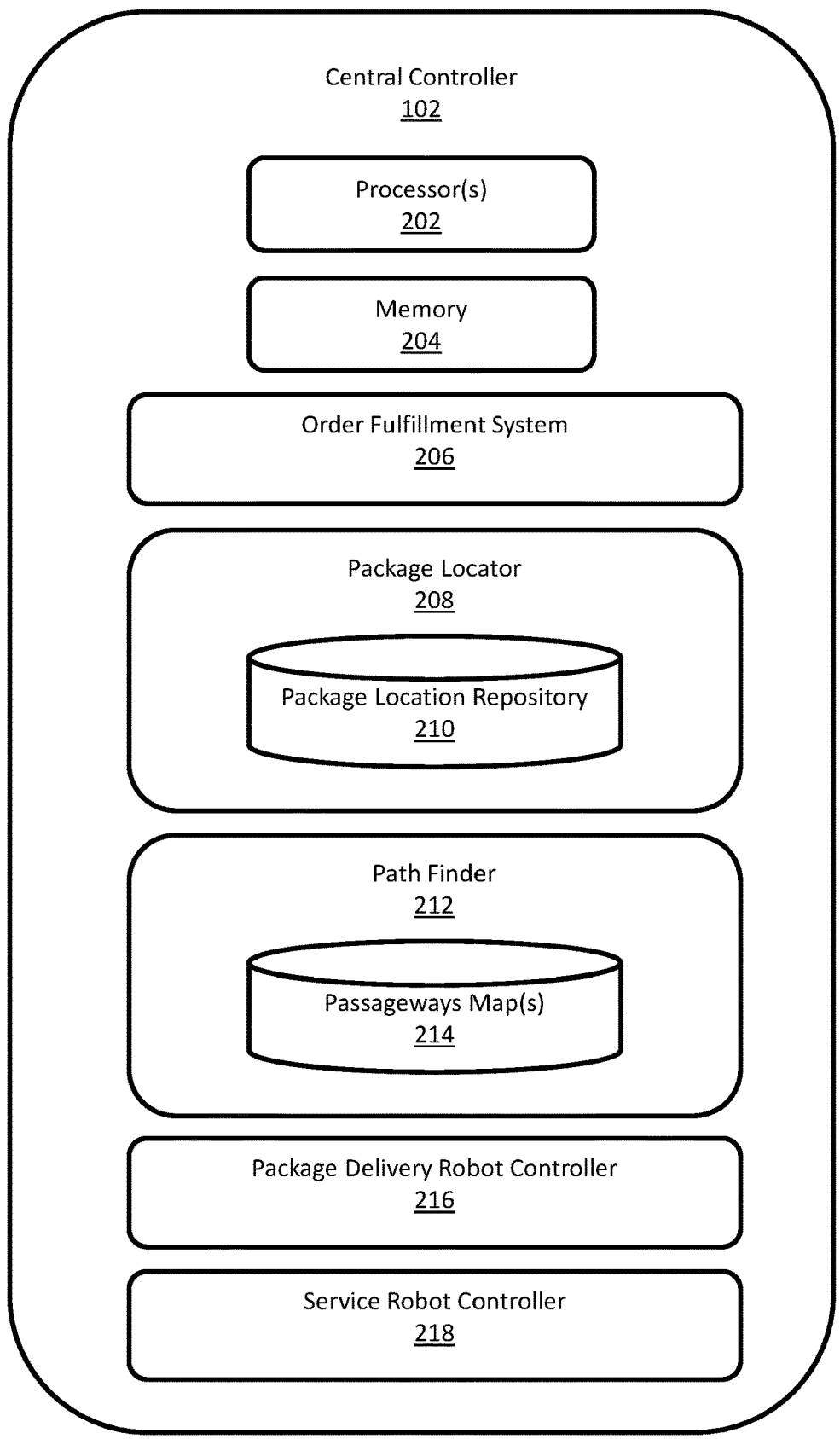
FIG. 2 is a block diagram of an example central controller.

FIG. 2 is a block diagram of an example central controller 102. The central controller 102 is a computer system that includes one or more processors 202 and memory 204 storing instructions for the processors 202.

The central controller 102 includes an order fulfillment system 206 that receives and processes orders that lead to packages being delivered. The order fulfillment system 206 can process the orders using any appropriate technology for processing orders. For example, the order fulfillment system 206 can perform some or all of the following functions:

1. Order processing: The system 206 can receive orders from customers through various channels, such as a website, a mobile app, or a telephone hotline. It then processes the orders, verifying that all necessary information is present and that the items being ordered are available in the warehouse.
2. Inventory management: The system 206 can maintain a record of the items in the warehouse and their locations. It updates this record as orders are fulfilled and as new items are received.
3. Picking and packing: Once an order is processed, the system 206 can determine which items need to be picked from the warehouse and directs workers or robots to gather those items. The gathered items are then packed into boxes or other containers for shipping.
4. Shipping: The system 206 can generate shipping labels and arrange for the packages to be transported by package delivery robots or other appropriate shipping systems.
5. Tracking and reporting: The system 206 can track the progress of orders through the fulfillment process and provide updates to customers on the status of their orders. It may also generate reports on the efficiency and accuracy of the fulfillment process.
6. Customer service: The system may include a customer service component that handles inquiries and complaints from customers. This may involve providing information on the status of orders, assisting with returns or exchanges, or resolving other issues that arise.

The central controller 102 includes a package locator 208 that determines, using a package location repository 210, the location of a package in the warehouse. The package locator 208 can include, for example, one or more of the following components:

1. Barcode scanners: The package locator 208 may use barcode scanners to read the unique identification codes on packages as they are received into the warehouse and as they are moved within the warehouse.
2. Tracking system: The package locator 208 can include software that maintains a record of the location of each package in the warehouse as packages are moved or handled.
3. RFID tags: Some warehouses may use RFID (radio-frequency identification) tags on packages to track their location. RFID tags can be read automatically by RFID scanners, which can then transmit the location information to the package locator 208.
4. Maps and layout information: The package locator 208 can include maps or other visualizations of the warehouse layout, along with information on where different types of packages are stored. This can help workers or robots locate packages quickly.
5. Search component: The package locator 208 can include a search function that allows users to locate packages by entering relevant information, such as the package's identification number or the name of the recipient.
6. Alerts: The package locator 208 can be configured to send alerts when a package is not where it is supposed to be or when it is approaching its expiration date. This can help warehouse staff take prompt action to correct any issues.

The central controller 102 includes a path finder 212 configured for determining, using one or more maps 214 of enclosed passageways, a path from a location in the warehouse to a package destination outside of the warehouse. In general, the path finder 212 can use any appropriate algorithm for determining the path. Typically, the path finder 212 is configured for processing postal addresses for delivery of the packages. The path finder 212 can perform, for example, one or more of the following steps for determining the path:

1. Geocode the addresses: The path finder 212 can convert the postal address into, e.g., latitude and longitude coordinates, using a geocoding service or database so that the path finder 212 can treat the addresses as points on a map.
2. Calculate the distance between the warehouse and the delivery destination: The path finder 212 can use the geocoded coordinates to calculate the distance between the warehouse and the delivery destination. This can be done using a distance formula, such as the Haversine formula, which takes into account the curvature of the Earth.
3. Determine the fastest route: The path finder 212 can use a mapping service or database to determine the fastest route between the warehouse and the delivery destination. This may involve taking into account factors such as number of turns in a path, obstacles blocking some passageways, and traffic within enclosed passageways.
4. Optimize for other factors: Depending on the specific requirements of the system 100, the path finder 212 can be configured to optimize for other factors. For example, the path finder 212 can be configured to consider the size and weight of the package, the availability of certain types of package delivery robots, or the need to make multiple deliveries along the way.
5. Generate instructions: Once the path has been determined, the path finder 212 can generate instructions for the package delivery robot to follow. For example, this can include providing turn-by-turn directions or a list of coordinates to follow.

The central controller 102 includes a package delivery robot controller 216 configured for instructing a package delivery robot to deliver a package to the package destination by travelling on the path. The package delivery robot controller 216 can also perform other optional functions, such as tracking the location of package delivery robots, reporting status to the order fulfillment system 206 (which may relay that information to customers).

The central controller 102 includes a service robot controller 218 configured for dispatching service robots. The service robot controller 218 can dispatch service robots for various functions such as: remediating malfunctioning robots; installing, repairing, and removing one or more network beacons within the enclosed passageways; and performing diagnostic tests on malfunctioning package delivery robots.

The service robot controller 218 can respond, for example, to a request from the package delivery robot controller 216 to remediate a malfunctioning package delivery robot. There are several ways that the service robot controller 218 could determine that a package delivery robot is malfunctioning. Here are a few examples:

1. Sensors: The robot may be equipped with sensors that can detect problems with its various systems, such as its wheels, motors, or sensors. For example, if a wheel is not turning properly, the robot may detect this through its encoders or through a sensor that measures the rotation of the wheel.
2. Performance monitoring: The robot controller 216 may monitor the performance of the robot over time and compare it to expected performance. If the robot's performance deviates significantly from expected levels, the robot controller 216 may flag the robot as malfunctioning.
3. Error messages: The robot may have built-in error reporting systems that can detect and report problems to the robot controller 216. For example, the robot may have a system that detects when it is running low on battery power or when it encounters an obstacle that it cannot overcome.
4. Manual inspection: A human operator may physically inspect the robot and identify problems with its systems or components. This could involve looking for visible signs of damage or wear and tear, or performing tests to ensure that the robot is functioning properly.
5. Remote diagnostics: The robot controller 216 may be able to remotely access the robot's systems and perform diagnostics to identify problems. This could involve running tests on the robot's sensors, motors, or other components to see if they are functioning properly.

Figure 3A:
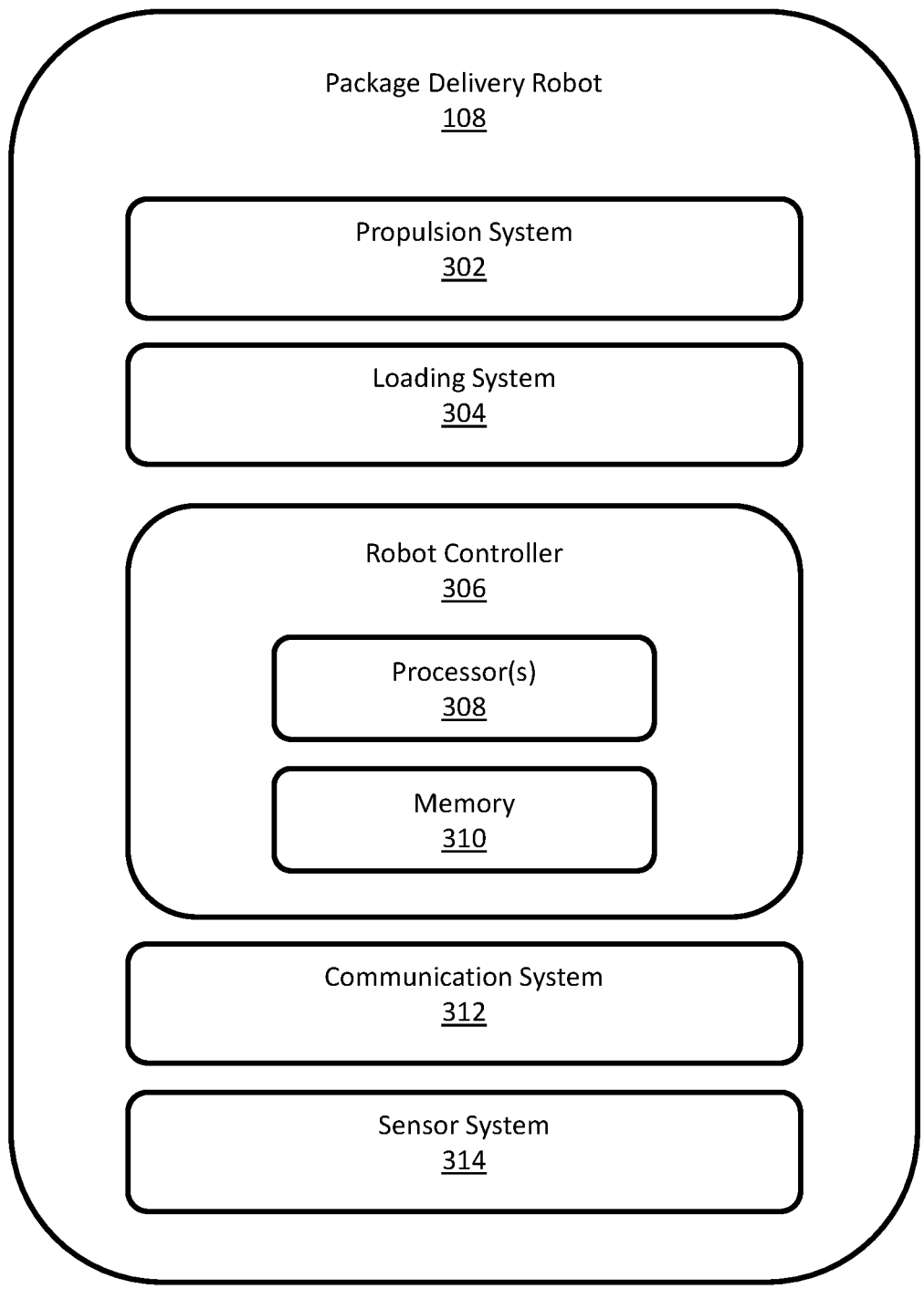
FIG. 3A is a block diagram of an example package delivery robot.

FIG. 3A is a block diagram of an example package delivery robot 108. The package delivery robot 108 includes a propulsion system 302, a loading system 304, a robot controller 306, a communication system 312, and a sensor system 314. The robot controller 306 includes one or more processors 308 and memory 310 storing instructions for the processors 308.

The robot controller 306 is configured for navigating, using the propulsion system 302, to the location of the package in the warehouse and loading, using the loading system 304, the package onto the package delivery robot 108. The robot controller 306 is configured for navigating, using the propulsion system 302, to the package destination by travelling on the path through one or more enclosed passageways and unloading, using the loading system 304, the package at the package destination.

The propulsion system 302 can be any appropriate type propulsion system for driving the robot 108 through the enclosed passageways 110. One common option is wheeled propulsion, which involves using one or more wheels to move the robot 108. These wheels can be driven by electric motors, pneumatic actuators, or other types of actuators.

Another option is legged propulsion, which involves using legs as the primary means of movement. This can be done using a variety of leg designs, such as single-legged, two-legged, or multi-legged configurations. Legged propulsion can be useful for robots that need to navigate uneven or slippery terrain, but it can be more complex and energy-intensive than wheeled propulsion.

Track-based propulsion is another option, which involves using tracks as the primary means of movement. This can be done using a single continuous track or multiple tracks. Track-based propulsion can provide good traction and stability, but it can be slower and less maneuverable than wheeled or legged propulsion.

Finally, some mobile ground robots use a combination of different propulsion systems, known as hybrid propulsion. This can offer a good balance of mobility and adaptability, but it can also be more complex and expensive than single-propulsion systems.

The loading system 304 is configured for loading packages onto and off of the robot 108. The loading system 304 can include any appropriate components for securing a package to the robot. For example, the loading system 304 can be implemented using one or more of the following components:

1. Conveyor belts: A conveyor belt is a mechanical system that moves packages along a continuous loop of material. The robot 108 can be equipped with a conveyor belt to load packages onto the robot's platform or into a storage area.
2. Vacuum grippers: A vacuum gripper is a device that uses suction to pick up and hold packages. The robot 108 can be equipped with vacuum grippers that allows it to pick up packages from a conveyor belt or other surface and place them onto the robot's platform or into a storage area.
3. Claws or grasping arms: The robot 108 can be equipped with claws or grasping arms that allows it to pick up and hold packages. These devices can be actuated using electric motors, pneumatic actuators, or other types of actuators.
4. Rollers or sliding surfaces: The robot 108 can include rollers or sliding surfaces that allow packages to be loaded onto the robot's platform or into a storage area.
5. Pallet jacks: Some mobile robots are designed to work with pallets, which are large platforms used to transport and store packages. These robots can be equipped with pallet jacks, which are devices that can lift and move pallets. The robot can then load or unload packages from the pallet as needed.

The communication system 312 can include any appropriate technology for communicating with the central controller 102 and, in some cases, with other robots. For example, the communication system 312 can include one or more antennas, a transceiver, and a communications card for communicating with wireless beacons placed throughout the enclosed passageways 110. The communication system 312 can include components for one or more of the following:

1. Radio frequency (RF) communication: The robot 108 can use RF communication to communicate with other devices or systems. This can be done using a variety of RF technologies, such as Bluetooth, Wi-Fi, Zigbee, or proprietary protocols. RF communication can be useful for allowing the robot 108 to communicate with devices over short distances, such as a central controller or with a nearby control computer.
2. Cellular communication: The robot 108 can use cellular communication to communicate with other devices or systems. This can be done using a variety of cellular technologies, such as 2G, 3G, 4G, or 5G. Cellular communication can be useful for allowing the robot 108 to communicate over longer distances, such as with a remote operator or with a cloud-based server, although cellular service may not be available when the robot 108 is in an underground tunnel.
3. Satellite communication: The robot 108 can use satellite communication to communicate with other devices or systems. This can be done using a variety of satellite technologies, such as GPS or satellite broadband. Satellite communication can be useful for allowing the robot 108 to communicate from remote or isolated locations where other types of communication are not available. Again, satellite communication may not be available when then robot 108 is in an underground tunnel.
4. Laser communication: The robot 108 can use laser communication to communicate with other devices or systems. This can be done using a variety of laser technologies, such as visible light lasers or infrared lasers. Laser communication can be useful for allowing the robot 108 to communicate over very long distances or in situations where other types of communication may be disrupted.
5. Hardwired communication: The robot 108 can use hardwired communication to communicate with other devices or systems. This can be done using a variety of wired technologies, such as Ethernet, USB, or RS-232. Hardwired communication can be useful for allowing the robot 108 to communicate with devices that are physically connected to it, such as sensors or actuators.

The sensor system 314 includes one or more sensors for aiding the robot 108 in navigating warehouses and enclosed passageways and for loading and unloading packages. The sensor system 314 can include any appropriate types of sensors. For example, the sensor system 314 can include one or more of the following components for navigation:
1. Laser range finder: This type of sensor uses lasers to measure the distance to objects in the environment. It can provide the robot 108 with information about the shape and layout of an enclosed passageway, as well as the presence and location of obstacles.
2. Ultrasonic sensors: These sensors use sound waves to detect objects and measure distance. They can be useful for detecting obstacles that may be close to the robot 108 or in its path.
3. IMU (inertial measurement unit): This sensor measures acceleration and angular velocity, which can be used to determine the robot's orientation and movement. It can help the robot 108 maintain its balance and stability as it moves through a warehouse or an enclosed passageway.
4. Compass: A compass can be used to help the robot 108 determine its heading and orientation within an enclosed passageway. This can be useful for navigation and localization.
5. Cameras: Cameras can provide the robot 108 with visual information about its environment, which can be used for tasks such as object recognition and localization.

To aid in loading and unloading of packages, the sensor system 314 can include one or more of the following components:
1. Force sensors: These sensors can measure the force applied to a manipulator or gripper, which can be used to determine the weight of a package or the amount of force needed to lift or move it.
2. Encoders: These sensors measure the rotation or movement of a robotic joint, which can be used to accurately position the manipulator or gripper when loading or unloading packages.
3. Cameras: Cameras can provide the robot 108 with visual information about the packages and the surrounding environment, which can be used for tasks such as package recognition and localization.
4. Proximity sensors: These sensors can detect the presence of objects in the robot's vicinity, which can be useful for detecting packages or obstacles that may be in the way of a manipulator or gripper.
5. LIDAR (light detection and ranging): This sensor uses lasers to create a 3D map of the environment, which can be used to accurately position the robot 108 and a manipulator or gripper when loading or unloading packages.

In some examples, the propulsion system 302 includes a battery system of one or more batteries. The robot controller 306 can be configured for monitoring the battery system and controlling the robot 108 to charge or swap the batteries at certain times. To program the robot controller 306 to monitor the battery system and cause the robot 108 to go to a charging station to swap or charge the battery system before it runs out of power, the robot controller can perform one or more of the following actions:
1. Identify a charging station location: The robot controller 306 can be programmed with the location of one or more charging stations, which could be done through the use of GPS coordinates or other types of location identification.
2. Monitor the battery level: The robot controller 306 can be programmed to regularly check the battery level and compare it to a predetermined threshold. When the battery level falls below the threshold, it is time for the robot to go to the charging station.
3. Determine the best path to the charging station: The robot controller 306 can be programmed to determine the best path to the charging station based on its current location, the location of the charging station, and any obstacles or constraints in the environment. This could be done through the use of algorithms for path planning and navigation.
4. Navigate to the charging station: Once the path to the charging station has been determined, the robot controller 306 can be programmed to navigate the robot 108 along this path using the propulsion system 302.
5. Charge or swap the battery: Once the robot reaches the charging station, it can be programmed to either swap the battery or initiate charging, depending on the specific battery system in place. The robot controller 306 can also be programmed to monitor the charging process and stop charging or swapping when the battery is fully charged or replaced.

Figure 3B:
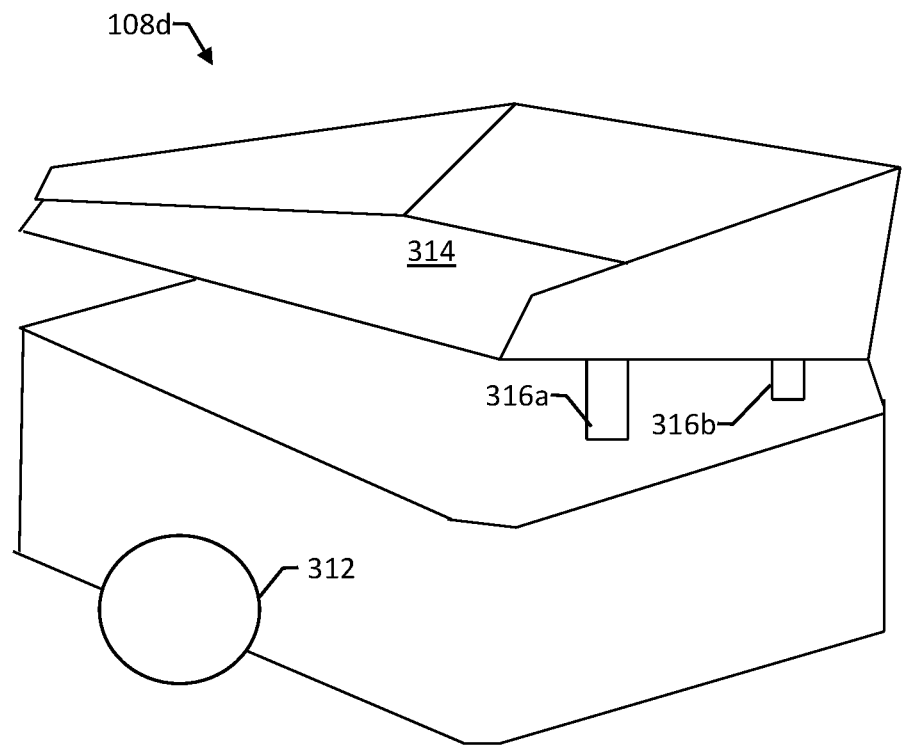
FIG. 3B shows an example type of package delivery robot using a passive loading system.

FIG. 3B shows an example type of package delivery robot 108*d* using a passive loading system. The robot 108*d* includes a wheeled propulsion system 312 and a tray 314 for securing a package. The robot 108*d* includes one or more actuators 316*a-b* configured for rotating the tray 314. A package can be dropped into the tray 314, and then the robot 108d can release the package by tipping the tray 314 so that gravity slides the package out of the tray 314.

Figure 3C:
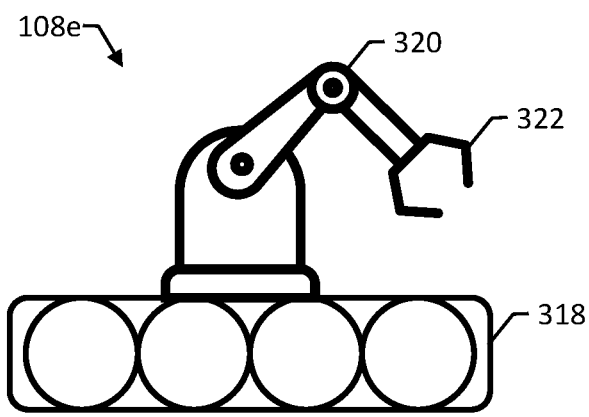
FIG. 3C shows another example type of package delivery robot using an active loading system.

FIG. 3C shows another example type of package delivery robot 108e using an active loading system. The robot 108e includes a tracked propulsion system 318 and a robotic arm 320 with a gripper 322 for a loading system. The robot 108e can use the gripper to hold onto a package, and the robot can release the package at the destination by releasing the gripper 322.

Figure 4:
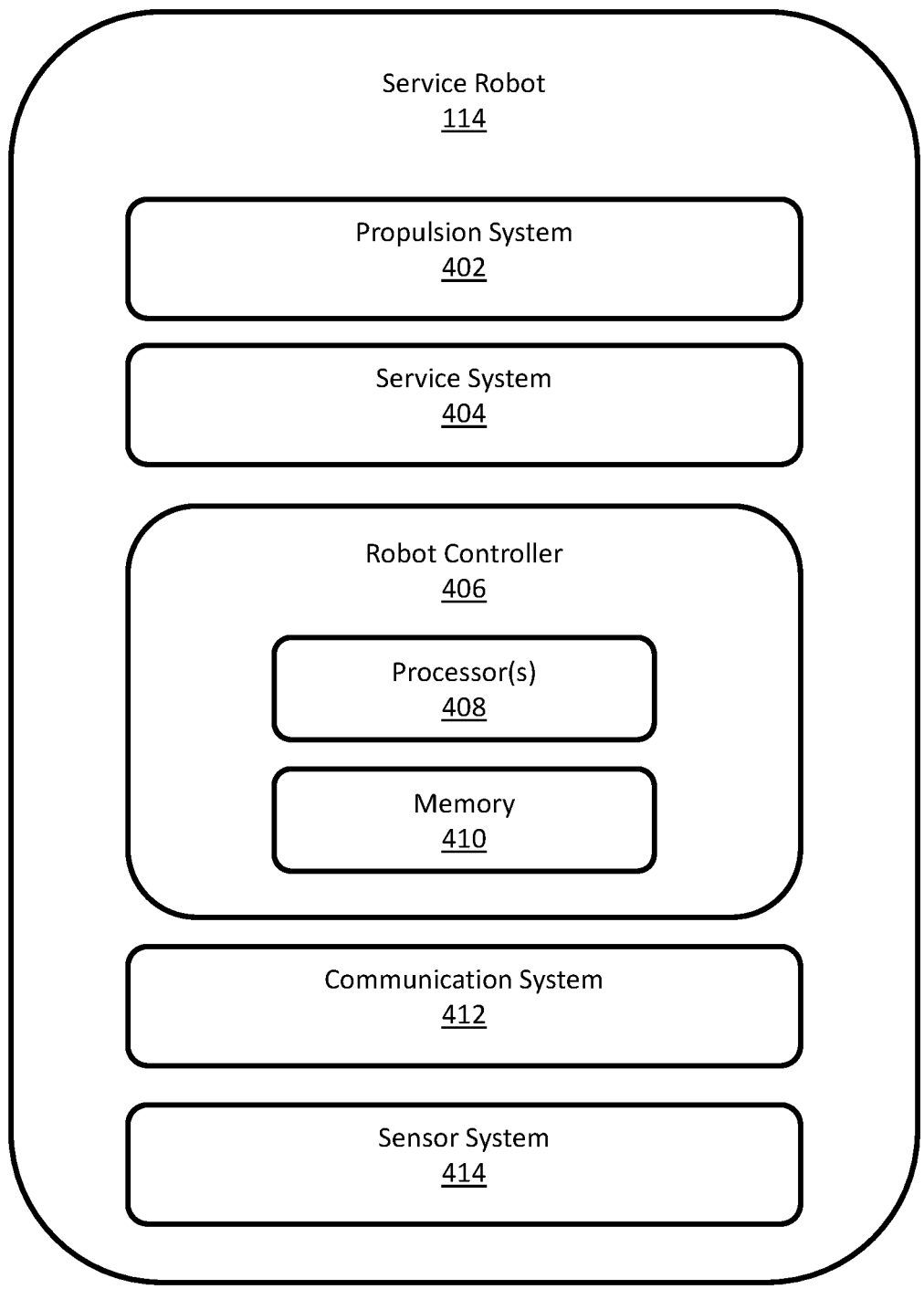
FIG. 4 is a block diagram of an example service robot.

FIG. 4 is a block diagram of an example service robot 114. The service robot 114 includes a propulsion system 402, a service system 404, a robot controller 406, a communication system 412, and a sensor system 414. The robot controller 406 includes one or more processors 408 and memory 410 storing instructions for the processors 408.

The robot controller 406 is configured for navigating, using the propulsion system 302, to a location where service is requested. The robot controller 406 can be configured to perform various types of service using the service system 404, such as remediating malfunctioning package delivery robots by repairing the malfunctioning robots or extracting malfunctioning robots. The propulsion system 402 can be any appropriate type propulsion system for driving the robot 108 through the enclosed passageways 110, such as those described above with reference to FIG. 3A.

The service system 404 can include any appropriate components for moving or repairing parts of the system. For example, the service system 404 can include one or more of the following:
1. Diagnostic tools: The robot 114 can be equipped with tools and sensors that allow it to diagnose problems with other mobile robots. This may include sensors that can detect problems with the robot's systems or components, diagnostic software that can analyze data from the robot's systems, or manual inspection tools such as cameras or mechanical probes.
2. Repair tools and equipment: The robot 114 can include a variety of tools and equipment that it can use to repair other mobile robots. This may include wrenches, screwdrivers, soldering irons, and other mechanical tools, as well as specialized equipment such as test benches or diagnostic equipment.
3. Manipulator arms: The robot 114 can include one or more manipulator arms that it can use to perform tasks such as removing and installing components, soldering connections, or tightening screws. These arms may be equipped with various end effectors, such as grippers, wrenches, or soldering tips, to allow the robot 114 to perform a wide range of tasks.
4. Safety measures: The robot 114 can include safety measures to protect itself and the malfunctioning robot during the repair process. This may include sensors that detect hazardous conditions or obstacles, or emergency shutdown systems that can be activated if necessary.
5. Repair control system: The robot 114 can include software to enable it to execute repair tasks autonomously or semi-autonomously. This may involve using sensors and algorithms to guide the robot's movements and actions, or using a remote operator to control the robot 114 remotely.

The communication system 412 can include any appropriate technology for communicating with the central controller 102 and, in some cases, with other robots. For example, the communication system 412 can include one or more antennas, a transceiver, and a communications card for communicating with wireless beacons placed throughout the enclosed passageways 110. Examples of components for the communication system 412 are described above with reference to FIG. 3A.

The sensor system 414 can include any appropriate components for navigation and repair tasks. Examples of components for the sensor system for navigation are described above with reference to FIG. 3A. For repair tasks, the sensor system 414 can include diagnostic and other components. For example, to configure the robot 114 to repair or move another malfunctioning robot, the sensor system 414 can include one or more of the following components:
1. Cameras: Cameras can provide the robot 114 with visual information about the malfunctioning robot and its surroundings, which can be used for tasks such as object recognition, localization, and navigation.
2. Laser range finder: This type of sensor uses lasers to measure the distance to objects in the environment. It can provide the robot 114 with information about the layout of the workspace and the presence and location of obstacles or other robots.
3. Force sensors: These sensors can measure the force applied to the robot's manipulator or gripper, which can be used to determine the weight of the malfunctioning robot or the amount of force needed to lift or move it.
4. Encoders: These sensors measure the rotation or movement of a robot's joints, which can be used to accurately position the manipulator or gripper when repairing or moving the malfunctioning robot.
5. Proximity sensors: These sensors can detect the presence of objects in the robot's vicinity, which can be useful for detecting the malfunctioning robot or obstacles that may be in the way of the manipulator or gripper.

Figure 5:
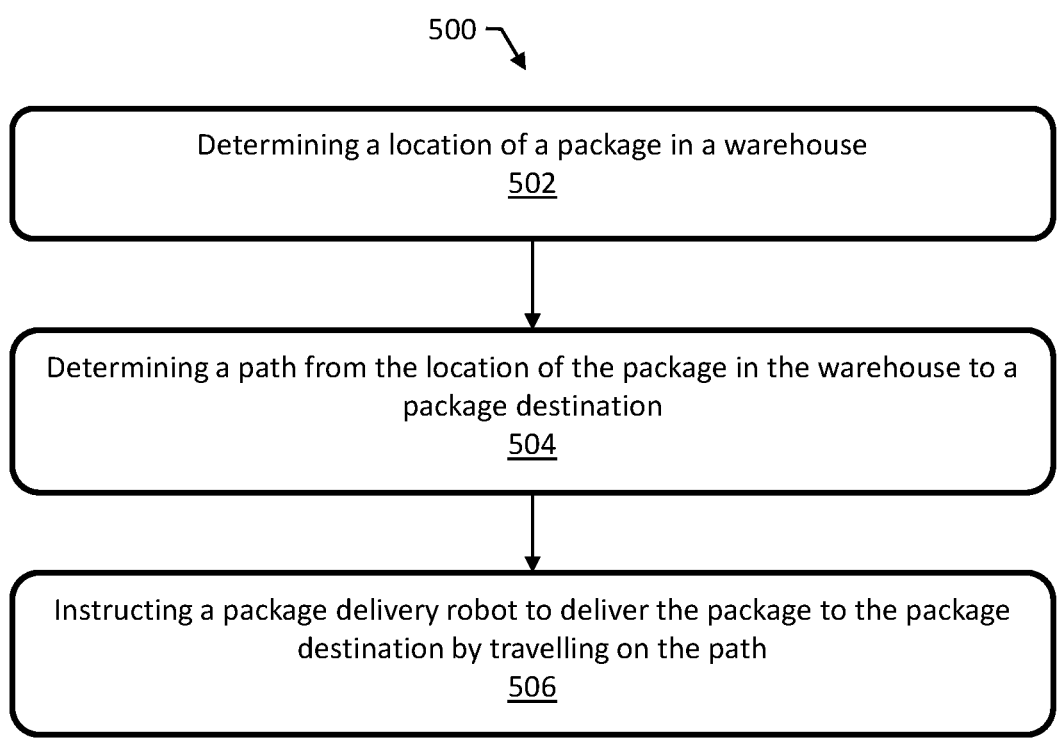
FIG. 5 is a flow diagram of an example method, performed by a central server, for delivering packages using mobile robots.

FIG. 5 is a flow diagram of an example method 500 for delivering packages using mobile robots. The method 500 can be performed by a central controller. The method 500 includes determining, by the central controller, a location of a package in a warehouse (502). The method 500 includes determining, by the central controller, a path from the location of the package in the warehouse to a package destination outside of the warehouse (504). The method 500 includes instructing a package delivery robot to deliver the package to the package destination by travelling on the path (506).

Figure 6:
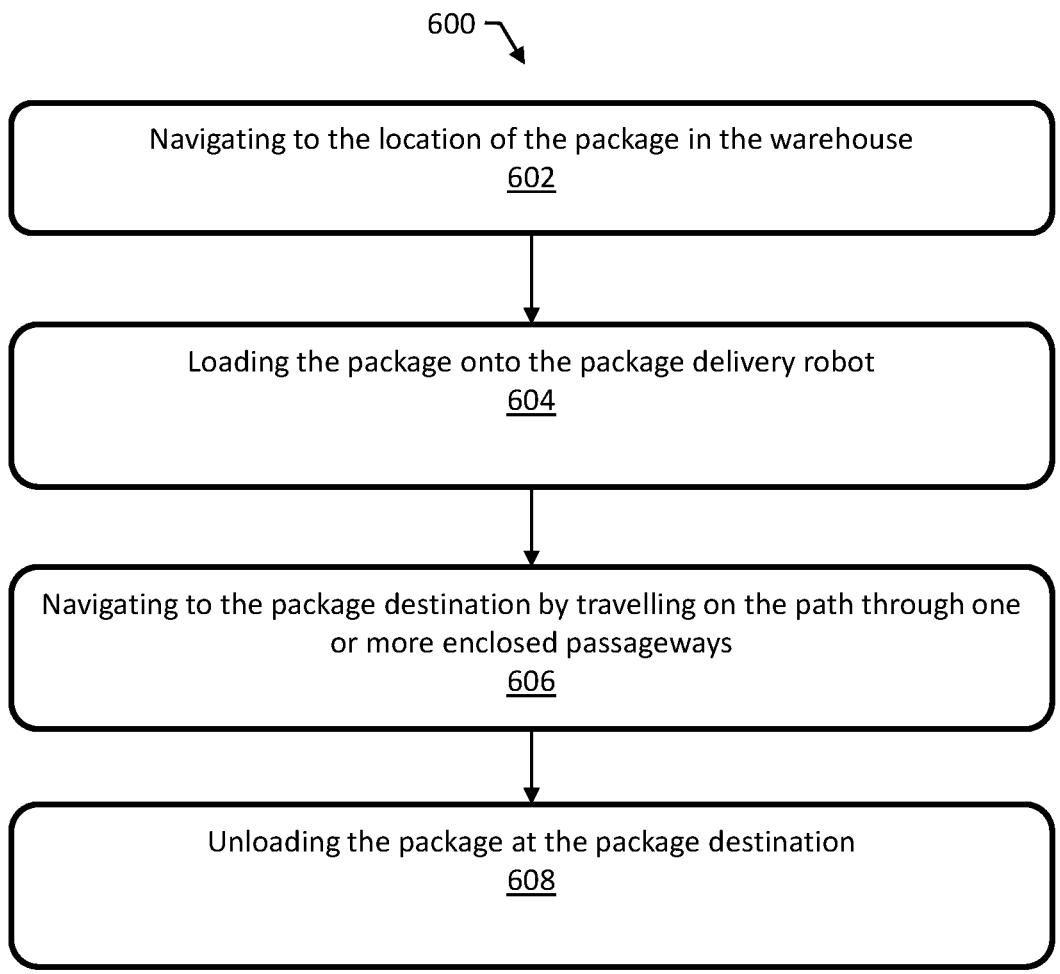
FIG. 6 is a flow diagram of an example method for delivering packages using mobile robots.

FIG. 6 is a flow diagram of an example method 600 for delivering packages using mobile robots. The method 600 can be performed by a package delivery robot. The method 600 includes navigating to the location of the package in the warehouse (602). The method 600 includes loading the package onto the package delivery robot (604). The method 600 includes navigating to the package destination by travelling on the path through one or more enclosed passageways (606). The method includes unloading the package at the package destination (608).

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for delivering packages using mobile robots, the system comprising:
a central controller configured for fulfilling a plurality of package delivery orders, including, for each package delivery order:
determining a location of a package in a warehouse;
determining a path from the location of the package in the warehouse to a package destination outside of the warehouse; and
instructing a package delivery robot to deliver the package to the package destination by travelling on the path; and
a plurality of package delivery robots, wherein each package delivery robot comprises a propulsion system, a loading system, and a robot controller configured for:
navigating, using the propulsion system, to the location of the package in the warehouse;
loading, using the loading system, the package onto the package delivery robot;
navigating, using the propulsion system, to the package destination by travelling on the path through one or more enclosed passageways; and
unloading, using the loading system, the package at the package destination; and a plurality of service robots, wherein the central controller is configured for detecting one or more malfunctioning package delivery robots and controlling one or more of the service robots to remediate the one or more malfunctioning package delivery robots;
wherein remediating the malfunctioning package delivery robots comprises repairing the malfunctioning robots or extracting the one or more malfunctioning robots from the enclosed passageways or both.

2. The system of claim 1, wherein the service robots are configured for at least one of:
installing, repairing, and removing one or more network beacons within the enclosed passageways; and
performing diagnostic tests on the malfunctioning package delivery robots.

3. The system of claim 1, wherein at least a first package delivery robot is configured for retrieving a first package from the warehouse and, at a point along a first path for the first package, transferring the first package to a second package delivery robot configured for delivering the first package to a first package destination for the first package.

4. The system of claim 1, wherein determining the path from the location of the package in the warehouse to the package destination comprises monitoring path congestion or detecting one or more obstacles or both.

5. The system of claim 1, wherein each package delivery robot comprises a battery system, and wherein each robot controller is configured for monitoring the battery system and determining a time to recharge a battery of the battery system or perform a battery swap.

6. The system of claim 1, wherein travelling on the path through one or more enclosed passageways comprises:
travelling on a first side of a first enclosed passageway and in a first direction; and
travelling, on a return trip, on a second side of the enclosed passageway in a second direction opposite the first direction.

7. The system of claim 1, wherein travelling on the path through one or more enclosed passageways comprises:
detecting an obstacle within a first enclosed passageway while traveling on a first side of the first enclosed passageway in a first direction;
determining that no other robots are traveling on a second side of the first enclosed passageway in a second direction opposite the first direction; and
traveling around an obstacle by moving from the first side to the second side and back to the first side after clearing the obstacle.

8. The system of claim 1, comprising a plurality of data communications network transponders within the enclosed passageways, wherein the central controller is configured for communicating with the package delivery robots via the data communications network transponders.

9. A method for delivering packages using mobile robots, the method comprising:
fulfilling, at a central controller, a plurality of package delivery orders, including, for each package delivery order:
determining a location of a package in a warehouse;
determining a path from the location of the package in the warehouse to a package destination outside the warehouse; and
instructing a package delivery robot to deliver the package to the package destination by travelling on the path;
delivering, by a plurality of package delivery robots, a plurality of packages, wherein each package delivery robot comprises a propulsion system, a loading system, and a robot controller, and wherein delivering each package comprises:
navigating, using the propulsion system, to the location of the package in the warehouse;
loading, using the loading system, the package onto the package delivery robot;
navigating, using the propulsion system, to the package destination by travelling on the path through one or more enclosed passageways; and
unloading, using the loading system, the package at the package destination; and detecting, at the central controller, one or more malfunctioning package delivery robots and controlling one or more service robots to remediate the one or more malfunctioning package delivery robots;
wherein remediating the malfunctioning package delivery robots comprises repairing the malfunctioning robots or extracting the one or more malfunctioning robots from the enclosed passageways or both.

10. The method of claim 9, comprising at least one of:
installing, repairing, and removing one or more network beacons within the enclosed passageways using the service robots; and
performing diagnostic tests on the malfunctioning package delivery robots by the service robots.

11. The method of claim 9, comprising retrieving, by a first package delivery robot, a first package from the warehouse and, at a point along a first path for the first package, transferring the first package to a second package delivery robot configured for delivering the first package to a first package destination for the first package.

12. The method of claim 9, wherein determining the path from the location of the package in the warehouse to the package destination comprises monitoring path congestion or detecting one or more obstacles or both.

13. The method of claim 9, wherein each package delivery robot comprises a battery system, and wherein each robot controller is configured for monitoring the battery system and determining a time to recharge a battery of the battery system or perform a battery swap.

14. The method of claim 9, wherein travelling on the path through one or more enclosed passageways comprises:
   travelling on a first side of a first enclosed passageway and in a first direction; and
   travelling, on a return trip, on a second side of the enclosed passageway in a second direction opposite the first direction.

15. The method of claim 9, wherein travelling on the path through one or more enclosed passageways comprises:
   detecting an obstacle within a first enclosed passageway while traveling on a first side of the first enclosed passageway in a first direction;
   determining that no other robots are traveling on a second side of the first enclosed passageway in a second direction opposite the first direction; and
   traveling around an obstacle by moving from the first side to the second side and back to the first side after clearing the obstacle.

16. The method of claim 9, comprising a plurality of data communications network transponders within the enclosed passageways, wherein the central controller is configured for communicating with the package delivery robots via the data communications network transponders.

* * * * *